United States Patent
Ito et al.

(10) Patent No.: US 6,520,784 B2
(45) Date of Patent: Feb. 18, 2003

(54) CARD CONNECTOR WITH EJECT DEVICE

(75) Inventors: Yoshikazu Ito, Yamato (JP); Masanori Yagi, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/804,444

(22) Filed: Mar. 12, 2001

(65) Prior Publication Data

US 2001/0031571 A1 Oct. 18, 2001

(30) Foreign Application Priority Data

Mar. 10, 2000 (JP) ........................................ 2000-66699

(51) Int. Cl.[7] .............................................. H01R 13/62
(52) U.S. Cl. ...................................................... 439/159
(58) Field of Search ................................. 439/155–160

(56) References Cited

U.S. PATENT DOCUMENTS

| | | | |
|---|---|---|---|
| 5,286,214 A | * 2/1994 | Takahashi | 439/159 |
| 5,536,180 A | 7/1996 | Ishida et al. | 439/159 |
| 5,846,096 A | 12/1998 | Ishida | 439/159 |
| 6,030,238 A | 2/2000 | Dong | 439/159 |
| 6,033,244 A | 3/2000 | Nishioka | 439/159 |
| 6,036,513 A | 3/2000 | Nishioka | 439/159 |
| 6,036,514 A | 3/2000 | Nishioka | 439/159 |
| 6,039,587 A | 3/2000 | Oguchi | 439/159 |
| 6,042,401 A | 3/2000 | Oguchi et al. | 439/159 |
| 6,042,403 A | 3/2000 | Nishioka | 439/159 |
| 6,059,587 A | 5/2000 | Ho et al. | 439/159 |
| 6,059,589 A | 5/2000 | Nishioka | 439/159 |
| 6,071,135 A | 6/2000 | Obara | 439/159 |
| 6,095,835 A | 8/2000 | Oguchi | 439/159 |
| 6,113,403 A | 9/2000 | Oguchi | 439/159 |
| 6,123,560 A | 9/2000 | Hara et al. | 439/159 |
| 6,162,075 A | 12/2000 | Hara et al. | 439/159 |

FOREIGN PATENT DOCUMENTS

| | | | |
|---|---|---|---|
| JP | 1-75983 | 5/1989 | H01R/23/00 |
| JP | 1-150387 | 10/1989 | H01R/23/00 |
| WO | WO 95/14317 | * 5/1995 | |

* cited by examiner

*Primary Examiner*—P. Austin Bradley
*Assistant Examiner*—James R. Harvey
(74) *Attorney, Agent, or Firm*—Stacey E. Caldwell

(57) ABSTRACT

A card connector for receiving a card C equipped with an eject device is disclosed wherein the connector includes a connector body having a housing with a receiving slot for the card and a metal shell for covering the housing. The eject device includes a slider movable between a forward position and a back position of the card, a coil spring for biasing the slider back to the back position of the card, and a cam mechanism for defining the sliding operation of the slider. The cam mechanism is provided on a side surface of the slider and includes a first guide groove defining the forward position of the slider, a second guide groove defining the back position of the slider, and a pin member movable within the guide grooves for defining the slider's position. The slider is received in a recess portion provided along a side of the housing and allows the connector to be relatively small in size.

14 Claims, 10 Drawing Sheets

CARD CONNECTOR WITH EJECT DEVICE

FIELD OF THE INVENTION

The present invention relates to a card connector for connecting an integrated circuit card, such as a memory, PC, or multimedia card, to another electronic device, and, in particular, a card connector provided with an eject device in which the card is inserted into the connector to a final position and ejected from the final position by a double push operation.

BACKGROUND OF THE INVENTION

Multimedia cards (MMC) are miniaturized cards of several centimeter square and are used in various media-related memory applications. MMC connectors are used in various types of electronic equipment to receive and connect such multimedia cards. In order to contribute to the miniaturization and reduction in weight of the electronic equipment in which the MMC connector is mounted (for example, a mobile computer, a digital camera, a portable digital video camera or the like) there is a corresponding demand that the card connector itself be further miniaturized and thinned.

Known card connectors are disclosed in Japanese Utility Application Laid-Open No Hei 1-75983, Japanese Utility Model Application Laid-Open No. Hei 150387 and the like. In the card connectors described in these publications, a connector is provided with an eject device in the form of a slider movably held within a connector body. The connectors are designed such that a card is inserted into the connector and an end of the card abuts an engagement portion of the slider and the slider moves together with the card.

In order to make it possible to perform a double push or "push-push" operation to eject the card from the connector, a cam mechanism is used in conjunction with the slider. This cam mechanism includes a cam portion and a pin member that moves within the cam portion and is typically positioned on a lower surface of the slider and a surface of the connector body adjacent and facing the lower surface. In such a card connector, since the cam member and the pin member are positioned in a thickness or vertical direction within the connector body, it is difficult to make the card connector thinner in the vertical direction.

A card connector that addresses this point is described in Japanese Patent Application Laid-Open No. Hei 11-135192. The card connector disclosed in this publication is provided with a cam mechanism having a cam portion and pin member wherein the cam portion and pin member are arranged on a side of the slider and confronting side wall of the connector body respectively so that the card connector can be made vertically thinner. However, in this card connector, in order to thin the system vertically, the cam mechanism is located on a side of the connector body and the connector body therefore projects laterally, occupying additional space on the underlying substrate. As a result, it is difficult to miniaturize the connector as a whole, as space must be occupied by the connector either in a vertical or horizontal manner due to the structure of the cam mechanism.

Also, in such a compact card connector, since the cam mechanism is miniaturized, the slider is arranged on one side of the connector body and pushed by a corner of the card. The slider is therefore not pushed symmetrically in the slide direction and may become biased. For this reason, the movement of the slider may not be smooth as the connector becomes more miniaturized.

SUMMARY OF THE INVENTION

An object, therefore, of the invention is to provide a card connector that can effectively be miniaturized and thinned, in both a vertical and horizontal direction.

Still another object of the present invention is to provide a card connector that keeps the movement of the slider continuous and smooth and therefore enhances the operation ability thereof.

In the exemplary embodiment of the invention, a card connector is provided having a connector body comprising a housing with a receiving slot for receiving a card and a metal shell for covering the housing. The connector includes an eject device comprising a slider which is pushed in during insertion of the card and slides between a forward position or loading position of the card and a back position or insertion position of the card, a spring for biasing the slider to its back position and a cam mechanism for limiting the sliding operation of the slider. The cam mechanism is provided on a side surface of the slider and comprises a first guide groove defining the forward position of the slider, a second guide groove defining the back position of the slider, and a pin member for movement within the guide grooves which defines the slider's position. The slider is received in a recess along a side of the housing and is covered by the metal shell. A spring portion for biasing the pin member is formed from a side surface of the metal shell. This not only avoids the need for a discrete spring member but also contributes to the overall thin and compact size of the connector.

The slider arrangement within the recess portion along the side of the housing allows the eject device of the connector to remain within the lateral dimensions of the connector, i.e. preventing the eject device from projecting laterally of the connector body. Therefore, it is possible to make the connector body relatively small and in a rectangular shape that substantially corresponds to the shape of the card. Therefore, in addition to allowing the connector to be relatively thinner, the overall connector is miniaturized, thereby reducing the occupation area of the connector on its underlying substrate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 4(a) is a side elevational view and

FIG. 4(b) is a cross-sectional view taken along the line A—A of FIG. 4(a);

FIG. 7(a) is an end view of the slider from one side and

FIG. 7(b) is an end view of the slider from the other side;

DETAILED DESCRIPTION OF THE PREFERRED EMBODIMENT

Figure 1:
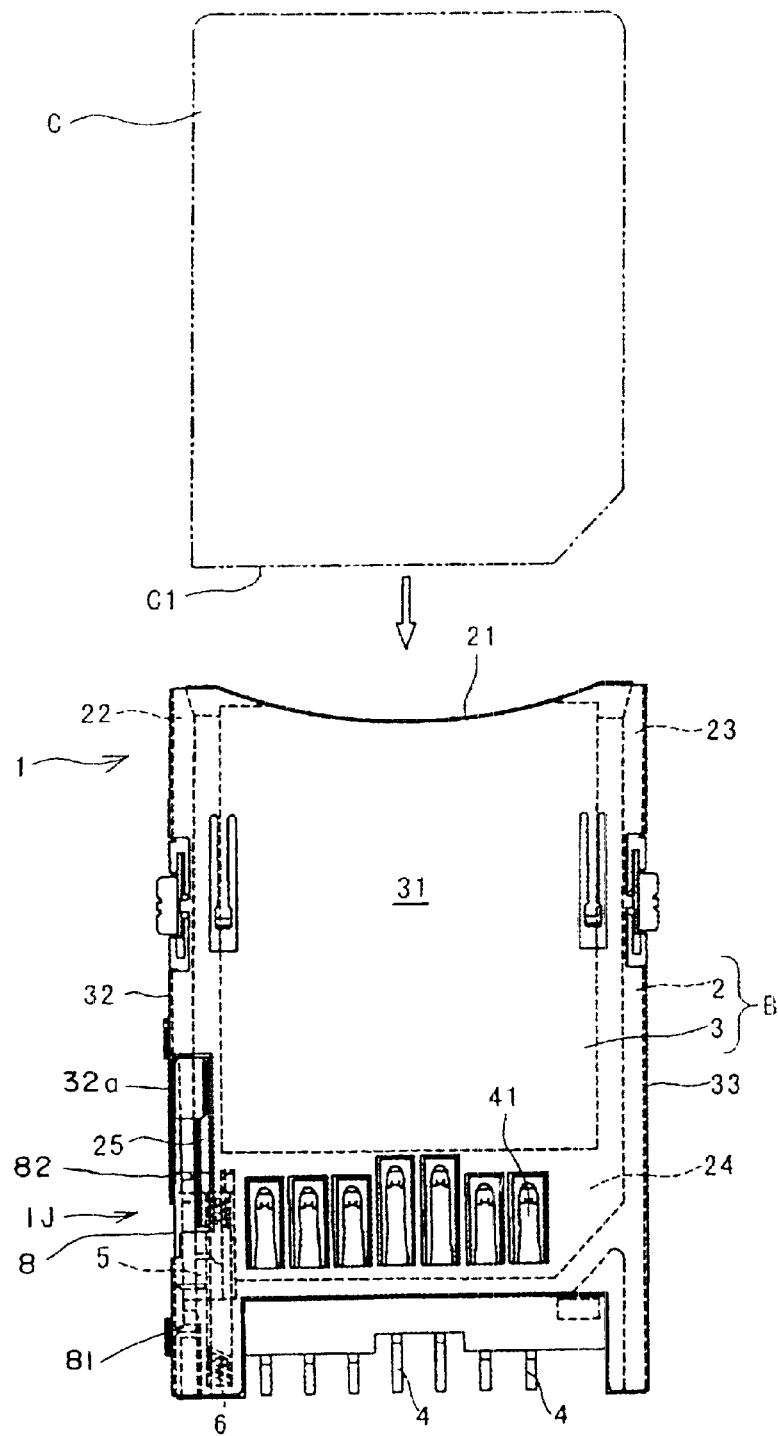
FIG. 1 is a plan view of a card connector according to the present invention.
Figure 2:
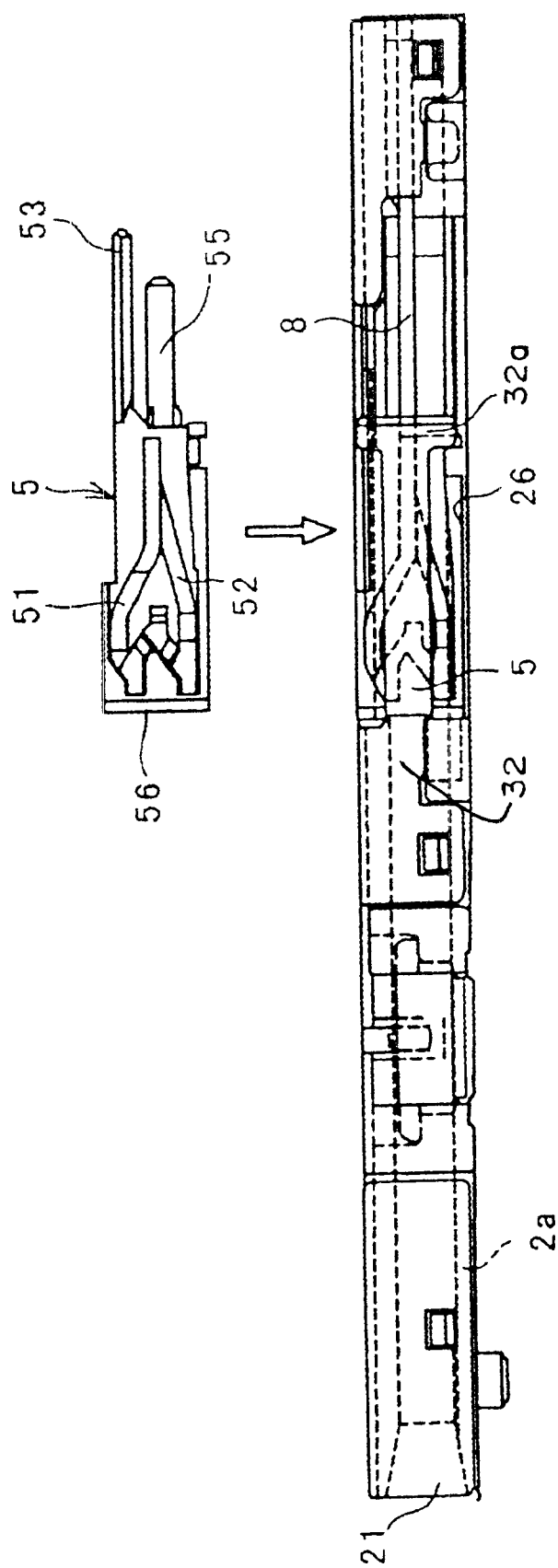
FIG. 2 is a side elevational view of the card connector of FIG. 1.
Figure 3:
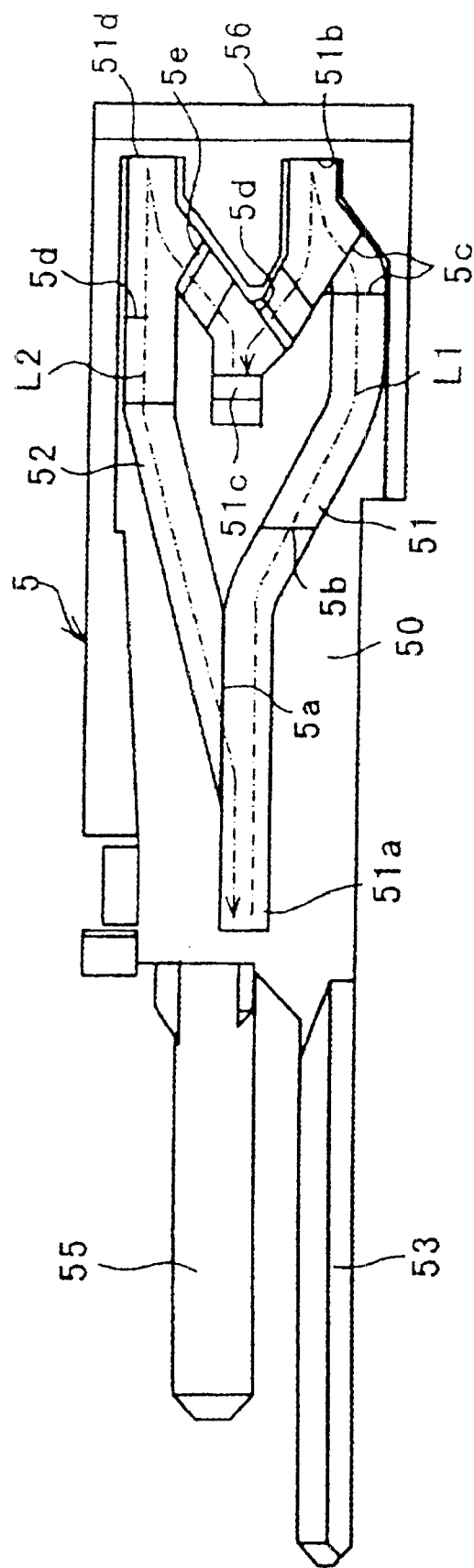
FIG. 3 is an enlarged side elevational view of a slider of the card connector of FIG. 1.

The present invention will now be described with reference to the drawings, and first to FIGS. 1, 2 and 3. FIG. 1 shows the present invention in the form of a connector 1 for an integrated circuit card C such as a multimedia card, PC card, or the like equipped with an eject device IJ. FIG. 2 is a side elevational view of the connector showing a cam mechanism assembled as part of the eject device. FIG. 3 shows an enlarged side elevational view of a slider. Card connector 1 is of generally rectangular shape and is provided with eject device IJ for card C to be inserted into a connector body B. Connector body B is composed of a housing 2 having a receiving slot 21 for receiving card C and a metal shell 3 for covering housing 2. Housing 2 is formed of insulation resin and has a bottom plate portion 2a (FIG. 2), right and left side wall portions 22 and 23, and a terminal mounting portion 24 provided on a front portion thereof. A plurality of terminal members 4 each having a contact portion 41 adapted to contact corresponding contacts (not shown) on card C are assembled into terminal mounting portion 24. Metal shell 3 is formed by stamping and forming a thin metal plate, and has an upper portion 31 and right and left plate portions 32 and 33.

Eject device IJ includes: a slider 5 which moves in a sliding direction in response to the insertion of card C and slides between a forward position or loading position of card C whereat the terminal members are not in contact with the corresponding card contacts, and a back position or insertion position of card C, whereat the terminal member are in contact with the corresponding card contacts; a coil spring 6 for biasing the slider to the back position of the card; and a cam mechanism 7 for guiding and defining the sliding operation of the slider.

Cam mechanism 7 is provided on a side surface of slider 5, and is provided with a first guide groove or cam groove 51 defining the forward position of slider 5, a second guide groove or cam groove 52 defining the back position of slider 5, and a pin member 8 for moving within guide grooves 51 and 52 and defining the sliding position of slider 5.

Slider 5 is received within a recess portion 25 along a side portion of housing 2 and is covered by metal shell 3.

Figure 4:
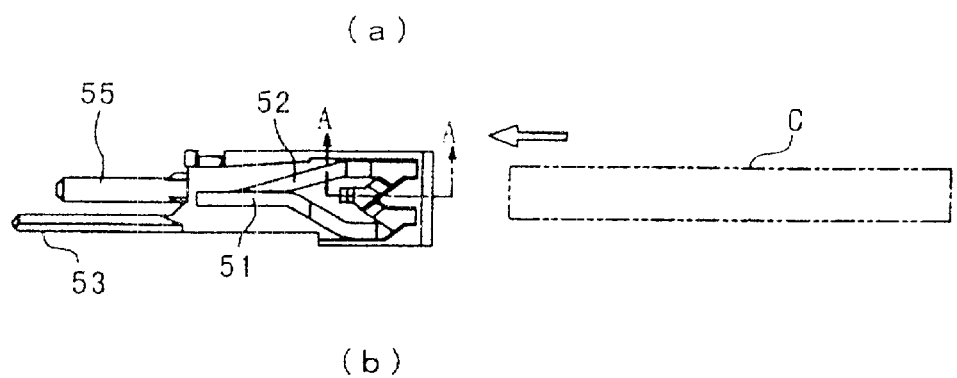
FIG. 4 shows two additional views of the slider according to the invention.
Figure 5:
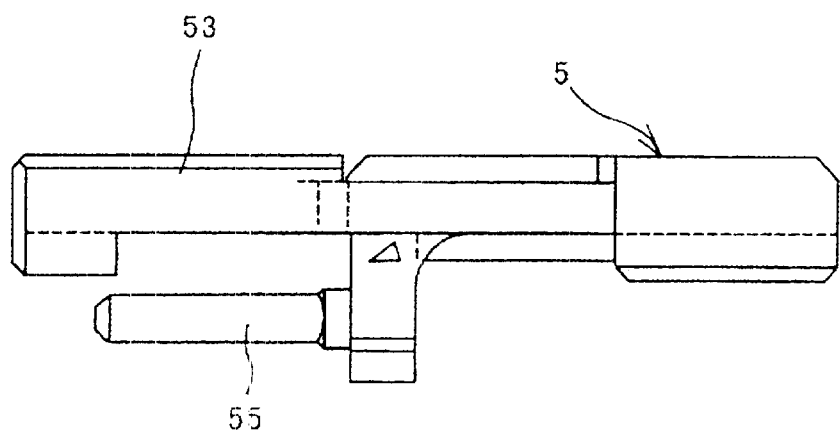
FIG. 5 is a plan view of the slider of the card connector of FIG. 1.

Looking at FIGS. 1 through 3 in conjunction with FIGS. 4 and 5, slider 5 is provided with a guide mechanism for allowing the slider to continuously and smoothly slide during the sliding action. Slider 5 is provided with a body portion 50 slidably mounted relative to the housing and a guide post portion 53 extending from body portion 50 in the sliding direction. The guide mechanism includes a guide groove 26 (FIG. 2) in housing 2 extending in the sliding direction of slider 5 and a projection 54 provided in guide post portion 53 for movement along guide groove 26. Guide post portion 53 is close to a side surface of slider 5, opposite the side surface of first and second guide grooves 51 and 52.

Figure 6:
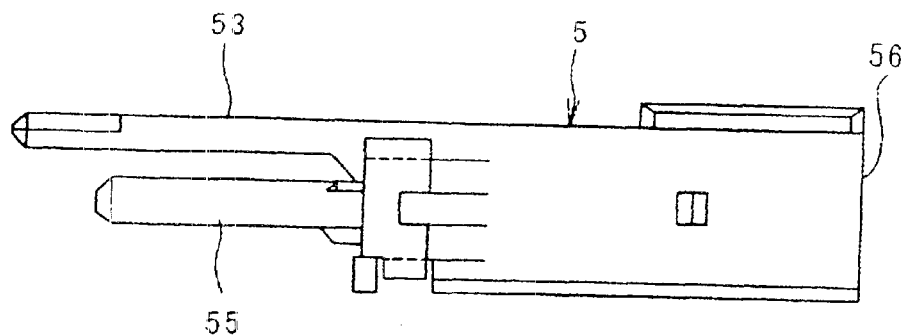
FIG. 6 is a rear view of the slider of the card connector of FIG. 1.
Figure 7:
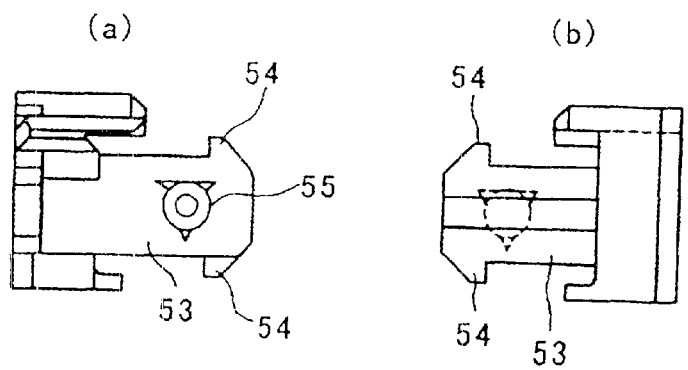
FIG. 7 shows two additional views of the slider according to the invention.
Figure 8:
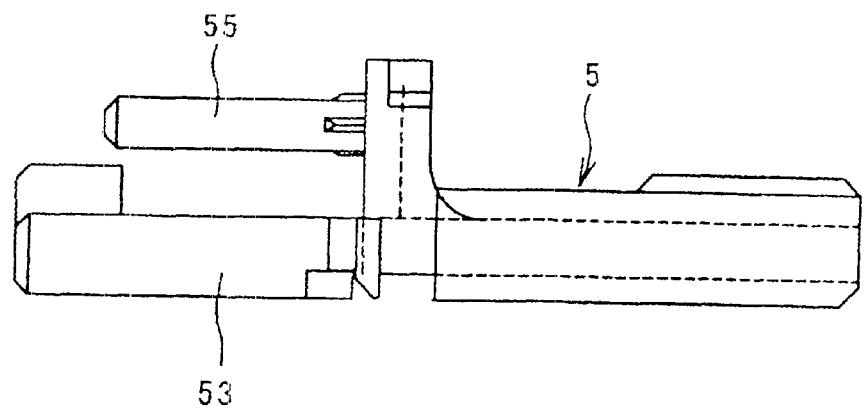
FIG. 8 is a bottom view of the slider according to the invention.
Figure 9:
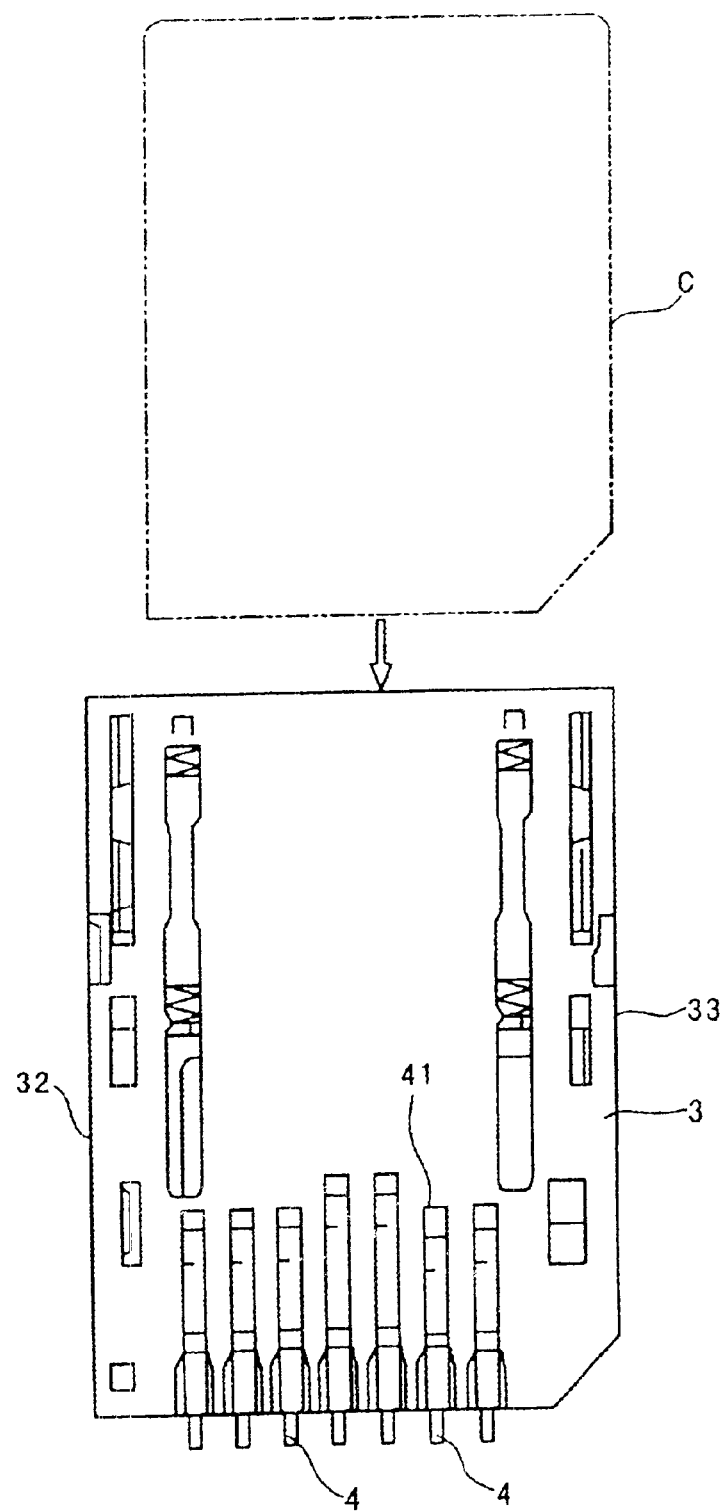
FIG. 9 is a plan view of the card connector housing according to the invention.

Looking now to FIGS. 6 through 8, slider 5 further includes a cylindrical projection 55 for inserting into and holding one end of coil spring 6. This cylindrical projection projects in the sliding direction of slider 5. Accordingly, coil spring 6 is held in a coaxial manner. A rear surface of slider 5 is formed into an abutment surface 56 perpendicular to the sliding direction of slider 5 so that a forward end C1 of card C is brought into abutting contact with abutment surface 56.

Side portion 32 of metal shell 3 is provided with a spring portion 32a for biasing a free end of pin member 8 when it is introduced into guide grooves 51 and 52 and prevents the free end portion from being pulled out. The spring portion 32a is formed inwardly from a portion of side portion 32 of metal shell 3.

Figure 10:
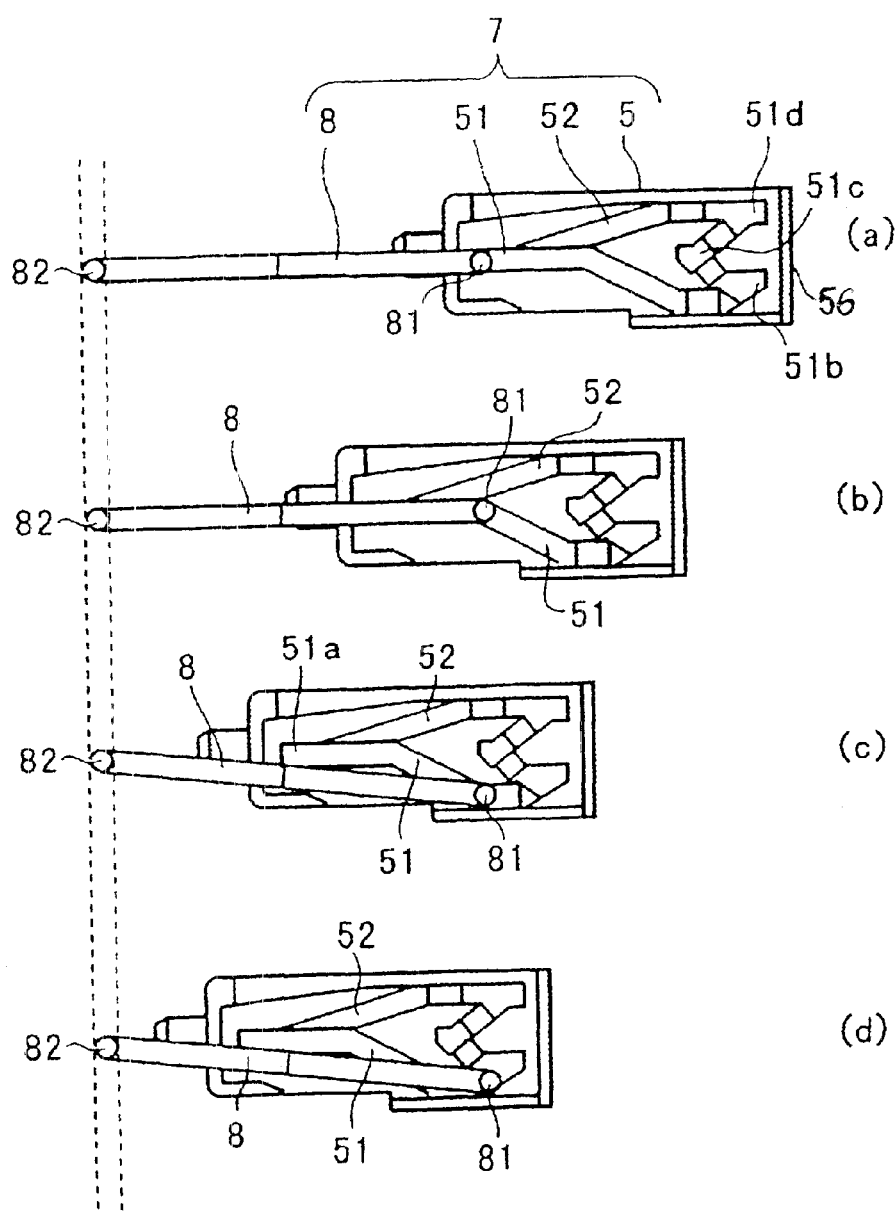
FIGS. 10(a) through 10(d) are sequential operation illustrations of the cam mechanism of the card connector according to the invention.
Figure 11:
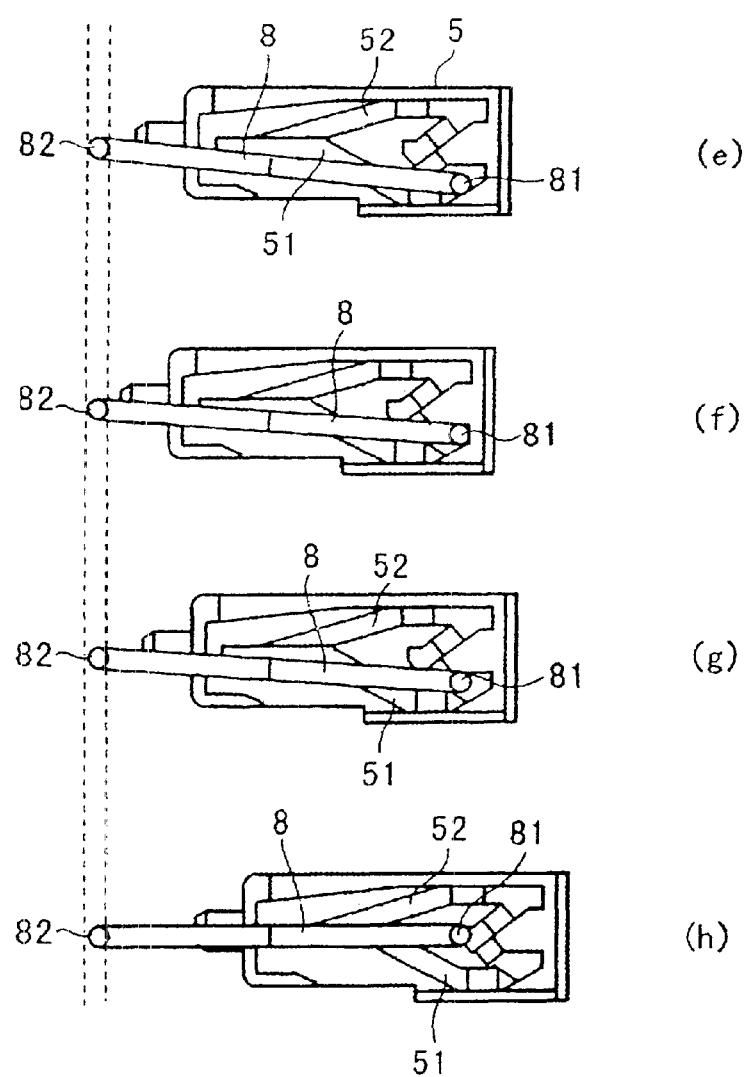
FIGS. 11(e) through 11(h) are further sequential operation illustrations of the cam mechanism according to the invention.
Figure 12:
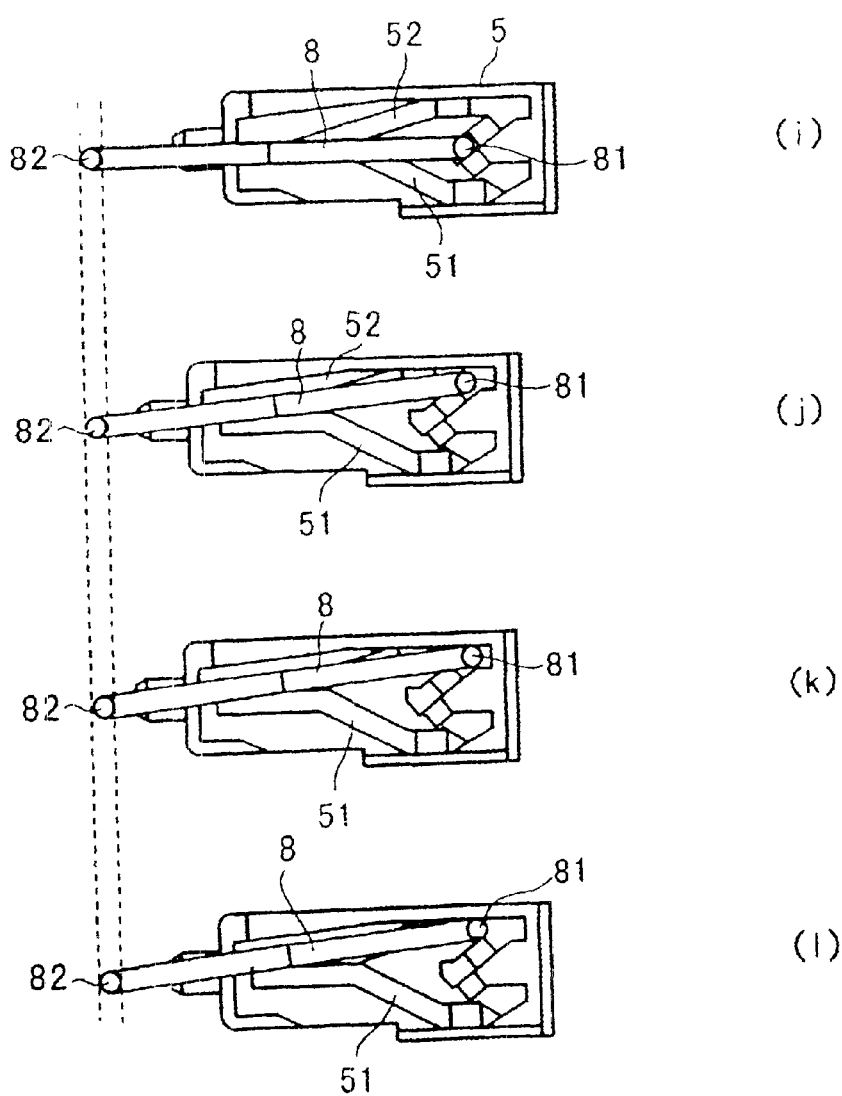
FIGS. 12(i) through 12(l) are still further sequential operation illustrations of the cam mechanism according to the invention.
Figure 13:
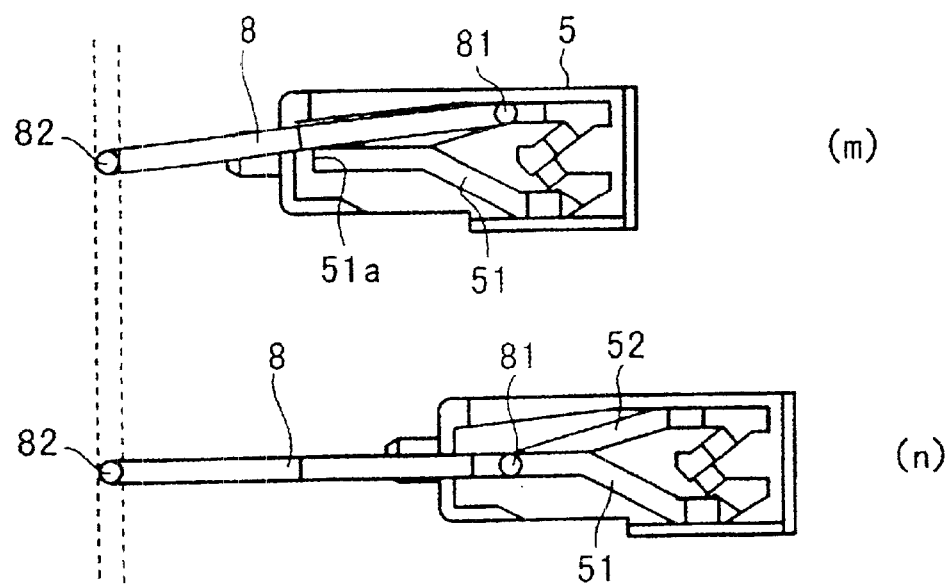
FIGS. 13(m) through 13(n) are further and final sequential operation illustrations of the cam mechanism according to the invention.

First guide groove 51 and second guide groove 52 are provided in one side surface of slider 5 and correspond to a forward passage L1 and a return passage L2 as indicated by the dotted and dashed line in FIG. 3. Free end of pin member 8 is formed into an L-shape and is provided at its end with an engagement shaft portion 81 that moves within the guide grooves to define the motion of the slider (see FIG. 10). Engagement shaft portion 81 is introduced into a start portion 51a of guide groove 51 at the back position of slider 5. A proximal end of pin member 8 is also formed into an L-shape to form a pivot shaft portion 82 relative to housing 2 and pivot shaft portion 82 is supported in housing 2 such that the free end of pin member 8 moves within each guide groove 51, 52 relative to pivot shaft portion 82.

The movement of the pin within cam mechanism 7 is shown in FIGS. 10 through 13. FIG. 10(a) shows the initial condition or the back position of card C where the card is not inserted. When card C is inserted into connector 1, the end portion C1 of card C is brought into abutment with vertical abutment surface 56 of slider 5 so that slider 5 is slidingly moved forward (toward the left in FIGS. 10 through 13). At this time, coil spring 6 is compressed. Also, engagement shaft portion 81 of pin member 8 is prevented from moving toward second guide groove 52 by the presence of a stepped surface 5a (see FIG. 3) so that it remains within first guide groove 51 (FIG. 10(b)).

As card C is further inserted, engagement shaft portion 81 passes through first groove 51 and is brought into abutment with rear end recess portion 51b as shown in FIGS. 10(c) to 11(f). Simultaneously, engagement shaft portion 81 moves through return-preventing stepped surfaces 5b and 5c (ref. FIG. 3). During this time, the contacts of card C and contact portions 41 of the connector remain in electrical contact with each other.

When the insertion of card C is stopped, slider 5 is moved backward by the action of coil spring 6. At this time, engagement shaft portion 81 is guided to end 51c of first guide groove 51 (see FIGS. 10(a) and 11(g) and (h)). At this point, card C is moved slightly backward but an electrical connection between the card and the connector is maintained. This condition is the back or final inserted condition of card C.

When card C is to be ejected, the exposed end of the card is pushed by a user. Specifically, when card C is pushed in the direction in which it was inserted, slider 5 is moved slightly in the forward direction so that engagement shaft portion 81 is moved toward second guide groove 52 passing through a return-preventing stepped surface 5e (FIG. 3) and brought into abutment with rear end recess portion 51d (see FIGS. 10(a) and 12(k)).

When the pushing force applied to card C stops, slider 5 is pushed back by the force of coil spring 6 to eject card C. At this time, engagement shaft portion 81 moves through second guide groove 52 and passes through stepped surfaces 5d and 5a (FIG. 3) to return to the initial position 51a (see FIGS. 12(l) to 13(m)).

Thus, engagement shaft portion 81 of pin member 8 moves through forward passage L1 along first guide groove 51 and return passage L2 along second guide groove 52 so that insertion and ejection of card C is performed by a simple double push or "push-push" operation.

Since slider 5 is received in recess portion 25 along the side portion of housing 2, the eject mechanism of the subject connector does not project to the side of connector body B. Thus, connector body B can be made in a simple rectangular shape that substantially corresponds to the shape of card C. Accordingly, in addition to being thin, the design allows the connector to be miniaturized horizontally such that the area occupied on an underlying substrate is reduced.

Since the spring portion for biasing the engagement shaft portion of pin member 8 within guide grooves 51 and 52 is provided in the side portion of metal shell 3, the provision of a separate spring component is avoided. This further contributes to the thin and compact size of the connector.

Due to the above-described structure of the guide mechanism, the slider slides smoothly and continuously during the sliding operation, so that movement of slider 5 functions well and operationability of the mechanism is enhanced. In the present design, guide post portion 53 of slider 5 is provided close to the side surface, opposite the surface of the first and second guide grooves such that the force applied to the first and second guide grooves and the force applied to guide post 53 are balanced when the cam mechanism operates, therefore providing a smoother movement of slider 5.

As described above, the card connector according to the present invention provides a compact and thin size connector that maintains smooth and continuous movement of the cam mechanism to enhance the operationability thereof It will be understood that the invention may be embodied in other specific forms without departing from the spirit or central characteristics thereof The present examples and embodiments, therefore, are to be considered in all respects as illustrative and not restrictive, and the invention is not to be limited to the details given herein.

We claim:

1. A card connector for receiving an integrated circuit card, comprising:
   a connector body including a housing having a receiving slot for receiving the card and a plurality of terminals mounted therein for contacting corresponding contacts on the card;
   a metal shell for covering a substantial portion of the housing;
   an eject device including
      a slider movably mounted on the housing and engageable with the circuit card for movement therewith between a forward position whereat the card contacts are not in contact with the terminals and a back position whereat the card contacts are in contact with the terminals,
      a slider spring for biasing the slider toward the back position,
      a cam mechanism including guide groove means on the slider for defining the relative position of the slider, and
      a pin member for movement within the guide groove means which defines the sliding position of the slider; and
   a spring portion integral with the shell for biasing the pin member into the guide groove means of the cam mechanism.

2. The card connector of claim 1 wherein said shell is stamped and formed of thin metal plate material, and said spring portion comprises a spring finger portion of the shell.

3. The card connector of claim 1 wherein said slider is movably mounted at a side of the housing, and said spring portion is integral with a side wall of the shell.

4. The card connector of claim 1 wherein said guide groove means include a first guide groove defining the forward position of the slider and a second guide groove defining the back position of the slider, and said pin member includes a free end with a shaft portion for movement within the guide grooves.

5. The card connector of claim 1 wherein said slider is received in a recess provided along a side portion of the housing and covered by the metal shell.

6. The card connector of claim 1, further comprising a guide mechanism for allowing the slider to slide within the housing of the connector body.

7. The card connector of claim 6 wherein said slider comprises a body portion mounted slidably relative to said housing and a guide post portion extending in a sliding direction of said slider away from said body portion, wherein said guide mechanism includes a guide groove extending in the sliding direction of the slider and a projection provided in said guide post portion for movement along the guide groove.

8. The card connector of claim 7 wherein said guide post portion is proximate a side surface of the slider, opposite to the side surface where said first and second guide grooves are provided.

9. The card connector of claim 1 wherein said slider spring comprises a coil spring, and the slider further includes a cylindrical projection projecting from the body portion for inserting into and holding one end of the coil spring.

10. A card connector for receiving an integrated circuit card, comprising:
   a connector body including a housing having a receiving slot for receiving the card and a plurality of terminals mounted therein for contacting corresponding contacts on the card;
   a metal shell stamped and formed of thin metal plate material for covering a substantial portion of the housing;
   an eject device including
      a slider movably received in a recess provided along a side of the housing and covered by the metal shell with the slider being engageable with the circuit card for movement therewith between a forward position whereat the card contacts are not in contact with the terminals and a back position whereat the card contacts are in contact with the terminals,
      a slider spring for biasing the slider toward the back position, a cam mechanism including a first guide groove defining the forward position of the slider and a second guide groove defining the back position of the slider, and a pin member including a free end with a shaft portion for movement within the guide grooves; and a spring portion integral with a side wall of the shell for biasing the shaft portion of the pin member into the guide grooves of the cam mechanism.

11. The card connector of claim 10, further comprising a guide mechanism for allowing the slider to slide within the housing of the connector body.

12. The card connector of claim 11 wherein said slider comprises a body portion mounted slidably relative to said housing and a guide post portion extending in a sliding direction of said slider away from said body portion, wherein said guide mechanism includes a guide groove extending in the sliding direction of the slider and a projection provided in said guide post portion for movement along the guide groove.

13. The card connector of claim 12 wherein said guide post portion is proximate a side surface of the slider, opposite to the side surface where said first and second guide grooves are provided.

14. The card connector of claim 10 wherein said slider spring comprises a coil spring, and the slider further includes a cylindrical projection projecting from the body portion for inserting into and holding one end of the coil spring.

* * * * *